(12) United States Patent
Mills et al.

(10) Patent No.: US 7,573,627 B2
(45) Date of Patent: Aug. 11, 2009

(54) AMPLIFIED BIMORPH SCANNING MIRROR, OPTICAL SYSTEM AND METHOD OF SCANNING

(75) Inventors: Patrick Mills, Arlington, VA (US); Paul Patterson, Newburgh, NY (US); Jason Zara, Vienna, VA (US); Stephen W. Smith, Durham, NC (US)

(73) Assignee: The George Washington University, Washington, DC (US)

( * ) Notice: Subject to any disclaimer, the term of this patent is extended or adjusted under 35 U.S.C. 154(b) by 269 days.

(21) Appl. No.: 11/190,048

(22) Filed: Jul. 27, 2005

(65) Prior Publication Data

US 2006/0285189 A1    Dec. 21, 2006

Related U.S. Application Data

(60) Provisional application No. 60/591,211, filed on Jul. 27, 2004.

(51) Int. Cl.
   *G02B 26/08*    (2006.01)
(52) U.S. Cl. ............... 359/224.1; 359/198.1; 359/199.1
(58) Field of Classification Search ................. 359/224, 359/198.1–199.4, 200.6–200.8, 224.1
   See application file for complete search history.

(56) References Cited

U.S. PATENT DOCUMENTS

| 5,245,464 | A | * | 9/1993 | Jensen ........................ 359/224 |
| 5,295,014 | A | * | 3/1994 | Toda .......................... 359/202 |
| 5,907,425 | A | * | 5/1999 | Dickensheets et al. ...... 359/224 |
| 5,969,465 | A | * | 10/1999 | Neukermans et al. ....... 310/333 |
| 2004/0085601 | A1 | * | 5/2004 | Swartz et al. ............... 359/196 |

* cited by examiner

*Primary Examiner*—James Phan
(74) *Attorney, Agent, or Firm*—Roylance, Abrams, Berdo & Goodman, L.L.P.

(57) ABSTRACT

An amplified bimorph scanning mirror for use in various optical systems, an optical coherence tomography scanner incorporating the amplified bimorph scanning mirror, and a method for manufacturing the foregoing are described. A method for optically scanning a target site using the amplified bimorph scanning mirror is further provided. The scan range which can be obtained by exemplary implementations of the present invention can be larger than the scan range made available by conventional scanners.

21 Claims, 5 Drawing Sheets

AMPLIFIED BIMORPH SCANNING MIRROR, OPTICAL SYSTEM AND METHOD OF SCANNING

CROSS-REFERENCE TO RELATED APPLICATION

This application claims benefit under 35 U.S.C. §119(e) provisional patent application Ser. No. 60/591,211 filed on Jul. 27, 2004, the entire disclosure of which is hereby incorporated by reference.

BACKGROUND OF THE INVENTION

1. Field of the Invention

Various implementations of the present invention are directed to an amplified bimorph scanning mirror for use in various optical systems and method of manufacturing thereof. Exemplary implementations of the present invention are also directed to an optical coherence tomography scanner incorporating the amplified bimorph scanning mirror. Exemplary implementations of the invention are further directed to a method of optically scanning a target site using the amplified bimorph scanning mirror. A scan range which can be obtained by exemplary implementations of the present invention can be larger than the scan range made available by conventional scanners.

2. Description of the Related Art

Optical coherence tomography (OCT) is an optical imaging technique analogous to ultrasound that uses partially coherent pulses of infrared light to interrogate the target and create images of sub-surface microscopic structures with a resolution of 10 µm or less.See Fercher, A. F., "Optical Coherence Tomography," *Journal of Biomedical Optics*, Vol. 1, No. 3, 157-173 (1996). The time delay of the received echoes is detected with interferometry, so a map of reflectivity versus optical depth can be created. OCT has been shown to produce images with high spatial resolution and penetration depths ranging from 1 to 3 mm.See Fujimoto, J. G., et al., "Optical biopsy and imaging using optical coherence tomography," *Nature Medicine*, Vol. 1, No. 9, 970-972 (1995). One of the first clinical application of OCT was in ophthalmology due to the ideal optical imaging environment in the eye.See Id. OCT has also shown great promise in other applications including intravascular imaging, imaging of the bladder and urinary tract and imaging of the lining of the gastrointestinal tract. See Id.

OCT creates a single line of data through a target. Therefore it is necessary to steer the infrared beam across the target and compile the individual data lines to form two- or three-dimensional images. This makes the beam scanning methodology and apparatus implementing the methodology one of the more critical aspects of an OCT system. Conventional scanning methods are mechanical and use galvanometers and other actuation techniques to steer the infrared beam across the target. A desirable feature for a scanning technique is to use a mirror structure facilitating minimally invasive medical interventions. Accordingly, a compact scanning method and a device for implementing such a method are needed.

Various conventional methods have been investigated for scanning the OCT beam for use in minimally invasive applications. For example, one conventional endoscopic OCT (EOCT) system design used in clinical trials uses a spinning reflective element to scan the infrared beam across the tissue in a circular side-scanning configuration.See Tearney, G., et al., "In Vivo Endoscopic Optical Biopsy with Optical Coherence Tomography," *Science*, Vol. 236, 2037-2039 (1997). See also Rollins, A. M., et al. "Real-time in vivo imaging of human gastrointestinal ultrastructure by use of endoscopic optical coherence tomography with a novel efficient interferometer design," *Optics Letters*, Vol. 24, 1358-1360 (1999). However, this conventional scanning arrangement allows the imaging probe to view targets only directly adjacent to the probe. On the other hand, a sectorscanning probe can enable the creation of images in a large sector to the side or front of the probe to guide interventional procedures conducted using instruments that are introduced concurrently with the imaging device.

Several conventional OCT probes have been developed which image in a non-circumferential scan geometry. These include probes that use piezoelectric bimorphs to scan the imaging fiber,see Boppart, S. A., et al., "Forward-imaging instruments for optical coherence tomography," *Optics Letters*, Vol. 22, 1618-1620 (1997), probes that use thermoelectric actuators to swing a scanning mirror, see Pan, Y., et al., "Endoscopic optical coherence tomography based on a microelectromechanical mirror," *Optics Letters*, Vol. 26, 1966-1968 (2001), probes that use a linear-scanning galvanometer to move the optics in a catheter probe, see Bouma, B. E. and G. J. Tearney, "Power-efficient nonreciprocal interferometer and linear-scanning fiber-optic catheter for optical coherence tomography," *Optics Letters*, Vol. 24, 531-533 (1999), and probes that use optical beam steering using different MEMS actuators, see Zara, J. M. and S. W. Smith, "Optical Scanner Using a MEMS Actuator," *Sensors and Actuators: A: Physical*, 102 (1-2): 176-184 (2002).

However, still larger scan ranges than those provided by the above-mentioned sector-scanning probes are desired.

SUMMARY OF THE INVENTION

One of the objectives of the present invention is to address the drawback of conventional methods and devices described above.

According to an exemplary embodiment of the present invention a scanning mirror for various uses such as, for example, in an optical coherence tomography scanner to obtain scanning images, is provided.

According to another exemplary embodiment of the present invention, an amplified bimorph scanning mirror suitable for use in devices and systems that utilize optical beam scanning is provided. Examples of devices implementing the above-mentioned exemplary embodiments of the present invention include laser hair removal, laser tattoo removal and bar code scanning devices.

According to an exemplary implementation of the present invention, a scanning mirror which is capable of achieving large scan angles is provided.

According to an exemplary implementation of the present invention, the scanning mirror is made of a polyimide having a base and a substantially flat support. The flat support can include a mirror on one face of the support. The mirror surface can be a separate element attached to the flat support.

According to an exemplary implementation of the present invention, the flat support and the base are integrally formed from a polymeric resin such as a polyimide and coupled together by a unitary living hinge.

According to an exemplary embodiment of the present invention, the flat support is coupled to the base by two torsional hinges formed on opposite sides of the flat support to enable the flat support to oscillate about an axis extending through the hinges. The hinges enable a torsional movement between the flat support and the base whereby the flat surface pivots and oscillates about an axis parallel with the plane of the flat support.

According to an exemplary implementation of the present invention, the hinges are positioned at a mid-point along the sides of the flat surface.

According to an exemplary implementation of the present invention, a forced vibration is generated by a piezoelectric bimorph to cause the flat support and the mirror to oscillate at a selected frequency about the axis of the hinges.

According to an exemplary implementation of the present invention, an amplified bimorph scanning mirror is provided for application in optical coherence tomography.

According to an exemplary implementation of the present invention, the scanning mirror can be fabricated using photolithography on a polyimide substrate.

According to an exemplary implementation of the present invention, a scanning mirror can use a bimorph actuator to drive a polyimide micromechanical structure at resonance.

According to an exemplary implementation of the present invention, a forced vibration of the micromechanical structure causes a polysilicon gold plated mirror attached to two torsion hinges to tilt.

According to an exemplary implementation of the present invention, the device can operate at resonance allowing large displacements of the mirror.

According to an exemplary implementation of the present invention, hinges comprise polyimide whose material properties allow for large torsion angles in the hinges to be realized.

According to an exemplary implementation of the present invention, mirror and support structures can be modeled using one-dimensional beam theory and fundamental vibration mechanics.

According to an exemplary implementation of the present invention, a method and device are provided which can achieve optical scan angles of up to 80 degrees using applied voltages of 35 V at resonant frequencies of 35 Hz.

According to an exemplary implementation of the present invention, a scanning mirror is provided for facilitating minimally invasive medical interventions

BRIEF DESCRIPTION OF THE DRAWINGS

A more complete appreciation of exemplary embodiments of the present invention, and many of the attendant advantages thereof, will be more apparent and better understood by reference to the following detailed description of the exemplary embodiments of the present invention when considered in conjunction with the accompanying drawings, in which like reference symbols indicate the same or similar components, wherein:

FIG. 4a shows the device in motion and FIG. 4b shows the device at rest.

DETAILED DESCRIPTION OF EXEMPLARY EMBODIMENTS

Figure 1:
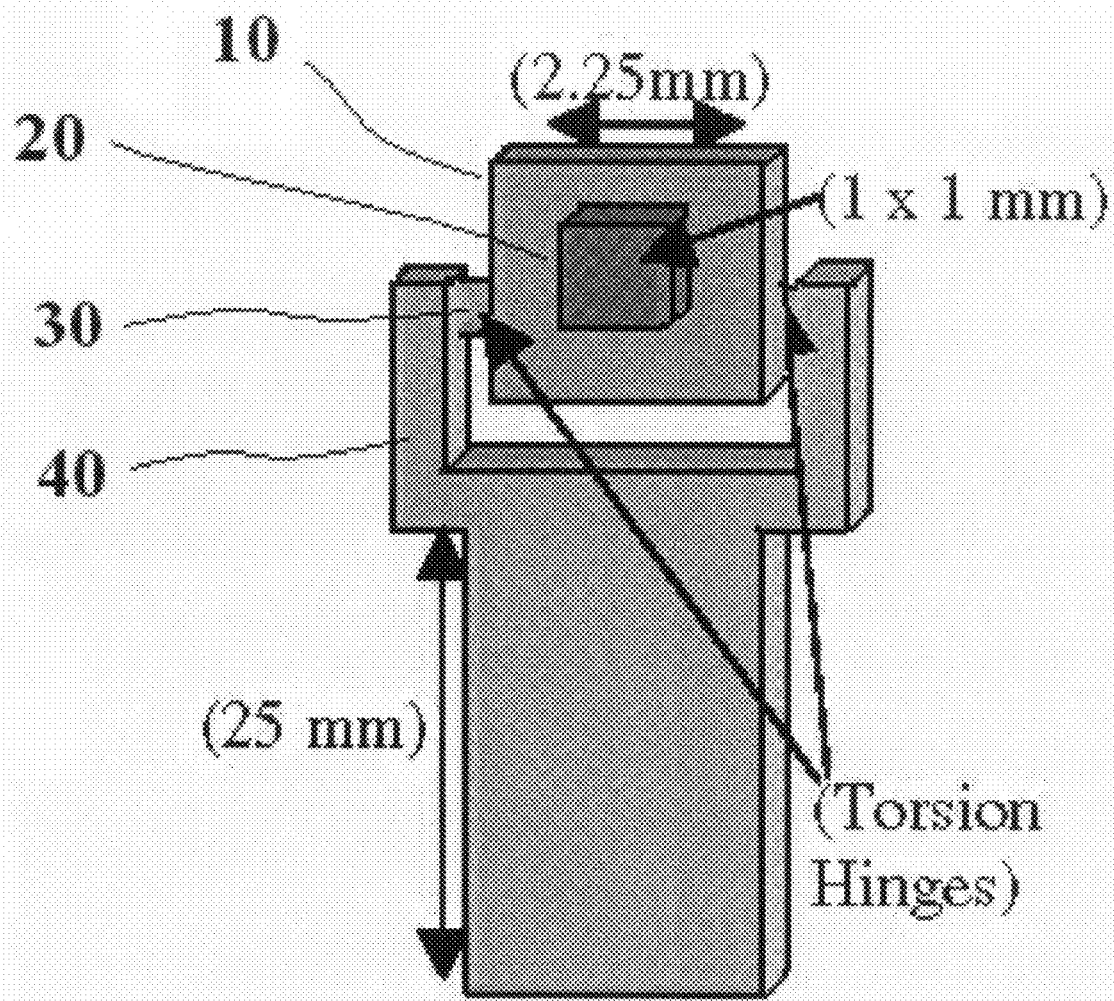
FIG. 1 is a schematic representation of a torsion mirror device according to an exemplary implementation of the present invention.

Reference will now be made to detailed description of exemplary embodiments of the present invention, examples of which are illustrated in the accompanying drawings wherein, as noted above, the same reference numerals will be used throughout the drawings to refer to the same or similar elements.

According to an exemplary embodiment of the present invention, a scanning mirror for use in an OCT system is capable of achieving large scan angles. In an exemplary implementation, a device can work on the same basic principle as a torsional pendulum. When the pendulum is set in motion by a driving force, it oscillates due to the restoring torque of the system. The exemplary device uses the same principle of torsion to achieve large angles of displacement. The material properties of polyimide are such that they allow very large torsion angles without suffering plastic deformation or failure of the polyimide hinges.

Referring to FIG. 1, an exemplary device can comprise a support, such as a table 10, with mirror 20 attached thereto. Table 10 can have a flat surface suspended by two small torsion hinges 30 on opposite sides thereof. Torsion hinges 30 are fixed at one end to the table and to a support base 40 at the other end. According to an exemplary implementation of the present invention, table sizes of 2 mm by 2.25 mm are provided. According to a further exemplary implementation of the present invention, hinges 30 are 3 µm thick, 250 µm long, and 90 µm wide. According to still further exemplary implementation of the present invention, the mass of the mirror and the dimensions of the scanning mirror used can be varied to develop devices with the desired scan deflections and frequency responses for various applications including OCT imaging applications. According to an exemplary implementation of the present invention, a mirror is 1 mm by 1 mm and is made of gold-coated silicon.

According to an exemplary implementation of the present invention, the mirror pivots about the torsion hinges with respect to the base when the structure is subjected to a forced vibration. According to an exemplary implementation of the present invention, the forced vibration is generated by a piezoelectric bimorph (2 mm×25 mm) attached to the base of the device.

According to an exemplary implementation of the present invention, the device has a relatively low resonant frequency (approximately 30-40 Hz). This enables driving the bimorph at a frequency well below its resonant frequency (215 Hz). The small tip displacement of the bimorph at low voltages is enough to excite the device. The motion it causes in the polyimide structure amplifies the small tip displacement of the bimorph into a large scan angle. Once in motion the weight of the mirror and its moment of inertia cause the hinges to twist. This develops a restoring torque in the hinges resulting in an oscillating motion of the mirror and the table.

According to an exemplary implementation of the present invention, the restoring torque is realized as the bimorph tip displaces in the opposite direction of travel. In a theoretical perfect oscillator this motion would continue indefinitely. However, in the case of practical implementations there are numerous factors that cause the oscillating motion of the device to stop rather quickly when no force is applied. A few of these factors are the effect of air damping and the stiffening of the hinges as they twist.

According to an embodiment of the present invention, the bimorph can be operated at the same frequency at which the structure resonates. This forced vibration causes the device to behave more like a theoretically perfect torsional pendulum or oscillator.

The resonant frequency of a structure can be predicted using equation (1) reproduce below, see Petersen, K., "Silicon Torsional Scanning Mirror", *IBM J. Res. Develop*. vol. 24 no. 5 (1980):

$$f_r = \frac{1}{2\pi}\sqrt{\frac{JG}{I\frac{l}{2}}}. \quad (1)$$

Where J is the polar moment of inertia of the hinge, G is the shear modulus of the hinge, I is the moment of inertia of the mirror, and l is the length of the hinge.

According to an exemplary embodiment of the present invention, the mirror assemblies can be fabricated using a three-layer process on five inch silicon wafers. A sacrificial silicon oxide layer is deposited on the wafer prior to processing to release the polyimide structures from the wafer. This sacrificial layer is later etched away using hydrofluoric acid (HF). To form the thin hinge layer, a 3 μm layer of polyimide, (for example, PI-2723, HD Microsystems, Wilmington, Del.) is spun onto the wafer and then patterned. According to an exemplary implementation of the present invention, thicker supports and tables are made of a 30 μm thick patterned polyimide layer (for example, Durimide, Arch Chemicals, Norwalk, Conn.).

According to an exemplary embodiment of the present invention, the mirror is mounted after the device has been released from the wafer, for example using the HF etching solution.

According to an exemplary embodiment of the present invention, the mirrors can be glued to the polyimide table using a fast drying epoxy. The entire device can then be mounted to the bimorph.

Figure 2:
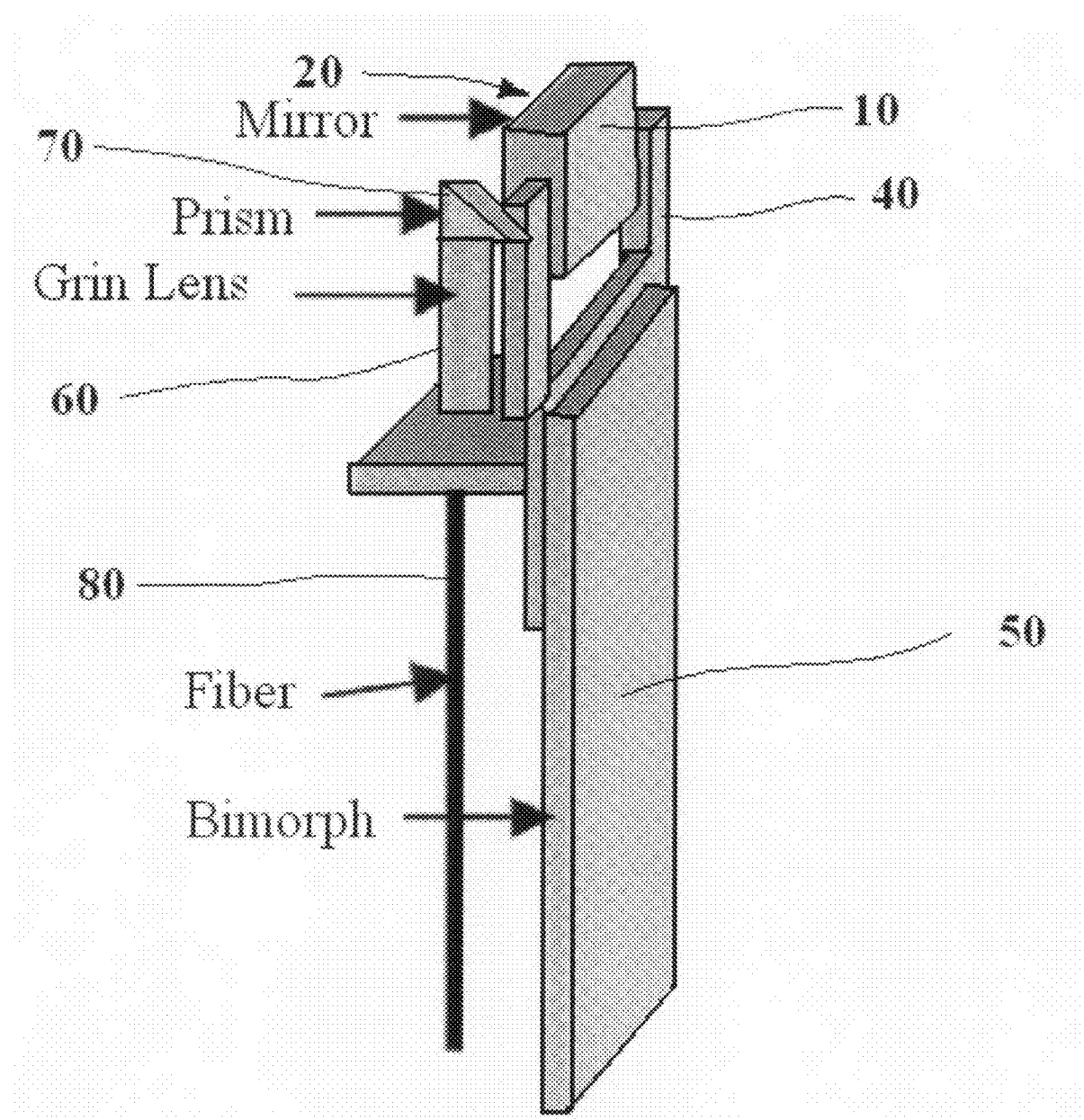
FIG. 2 is a schematic representation of a torsion mirror device with optional optics which can be provided according to an exemplary implementation of the present invention.

FIG. 2 shows a schematic of a device with fiber optics attached according to an exemplary embodiment of the present invention. In an exemplary implementation, Grin lens 60 is 1 mm in diameter and is enclosed in a 2 mm diameter casing which is 9 mm in length. Grin lens 60 has a 5 mm focal length. The attached prism 70 is a 1 mm right angle microprism. The Grin lens 60 is used to focus, for example, an infrared beam through the right angle prism onto the mirror. When the mirror is driven by the bimorph, for example, infrared beam is scanned across the target.

Figure 3:
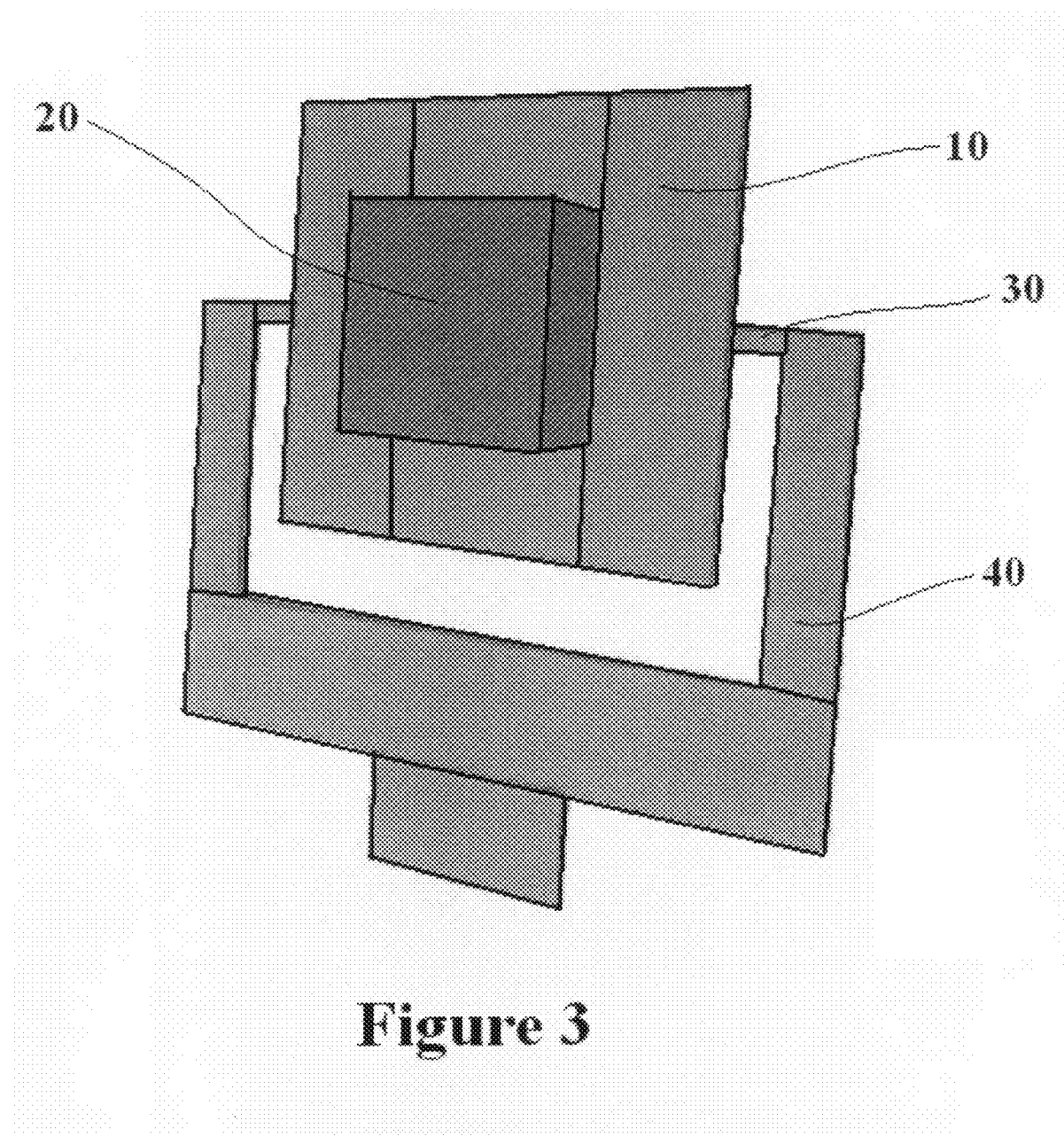
FIG. 3 is a schematic representation of an exemplary implementation of the present invention as simulated by a microelectromechanical (MEMS) analysis package and finite analysis software.

The mirror and support structures were modeled using one-dimensional beam theory and fundamental vibration mechanics. The structures were also modeled and simulated using Intellisuite (Corning Inc., Coming, N.Y.), a microelectromechanical (MEMS) analysis package and finite element analysis (ANSYS, Inc., Canonsburg, Pa.). FIG. 3 shows an exemplary implementation of a device according to the present invention. According to an exemplary embodiment of the present invention, certain dimensions of the device can be altered to achieve optimal resonant frequencies for use in other OCT systems.

According to an exemplary embodiment of the present invention, torque applied to the hinges 30 causes a twisting motion. This motion is related to an angle in the hinge. The angle at which a hinge twists is the same angle that the mirror attached to the hinge is displaced. The angle of displacement can be predicted using equation 2, see Petersen:

$$\theta = \frac{TL}{JG}. \quad (2)$$

Where T is the torque applied, L is the length of the torsion hinge, J is the polar moment of inertia of the torsion hinge and G is the shear modulus.

According to an exemplary embodiment of the present invention, the torque is generated by the tip displacement of the piezoelectric bimorph accelerating the mass of the table 10 and mirror 20. In an exemplary implementation, the optical displacement of the mirror was determined by using a calibrated target with a grid printed on it. This target was placed a known distance from the mirror. For example, 3 mW HeNe laser, was reflected off the mirror and scanned across the target. Displacements were measured by tracing the path of the beam across the calibrated target as the bimorph was driven at frequencies between 0-140 Hz and 5-100 volts peak to peak.

According to exemplary implementations of the present invention, devices had resonance frequencies between 31 and 42 Hz. Mirrors yielded optical scans of up to 80°. According to another exemplary embodiment of the present invention, the driving voltages can be varied between 15-100 volts peak to peak. An optimal drive voltage for the bimorph which allows large scan angles is approximately 35 volts peak to peak. Enough force is generated at the tip of the bimorph to excite a device. According to an exemplary embodiment of the present invention, the resonant frequency is approximately 30.5 Hz. Using equation (1) an estimated frequency is 35 Hz.

Figure 4:
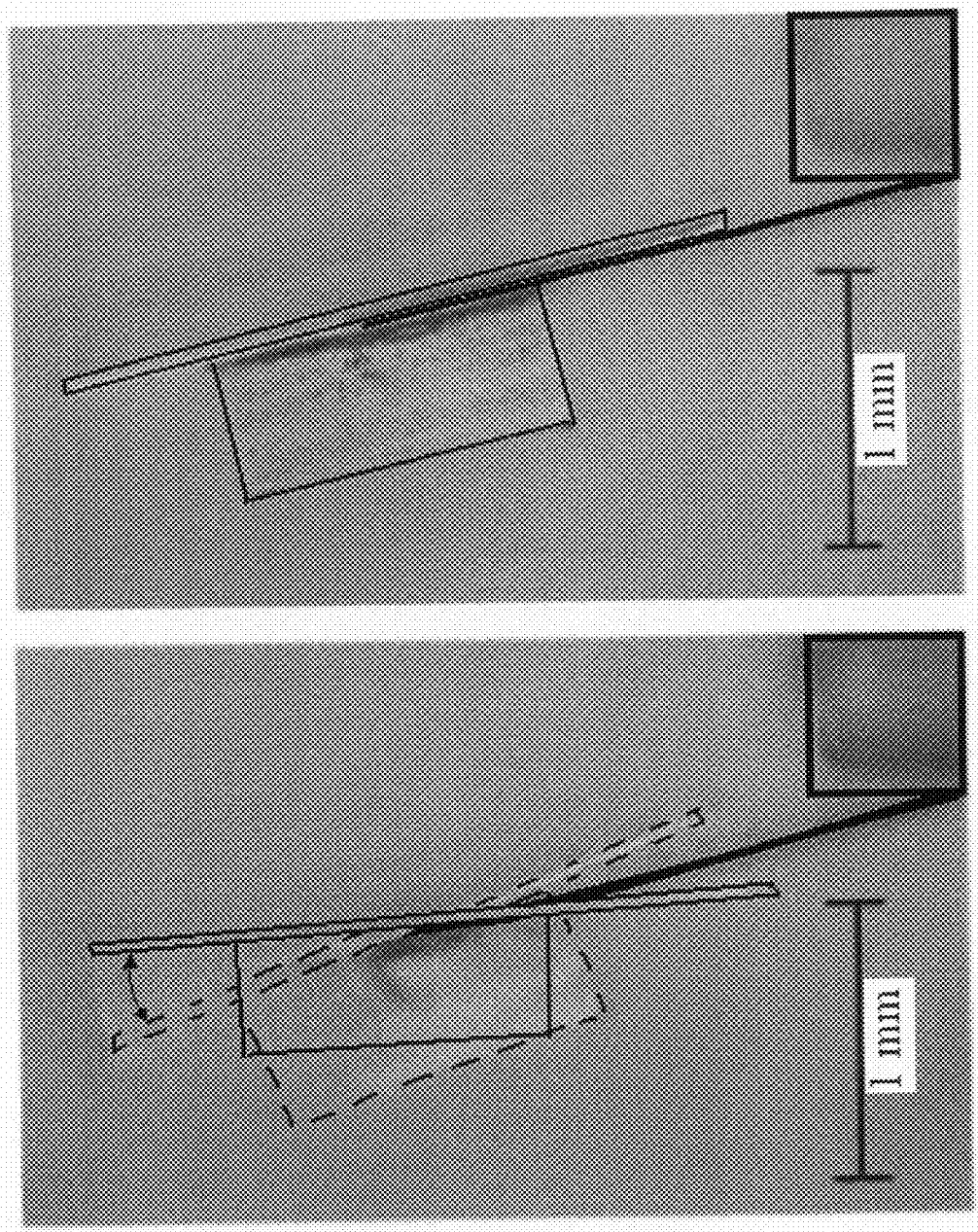
FIGS. 4a and 4b show an exemplary implementation of a device according to an embodiment of the invention, where
Figure 5:
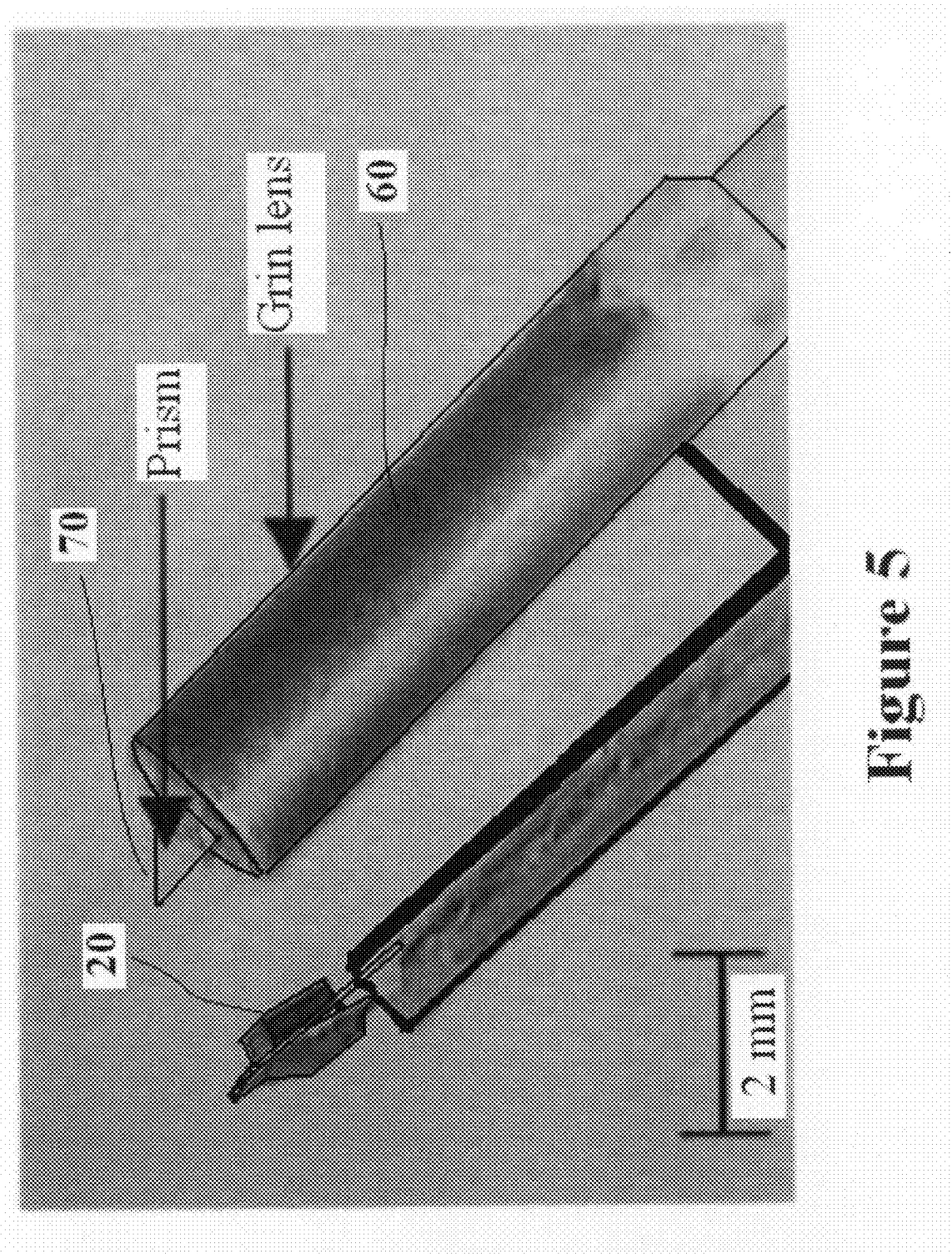
FIG. 5 shows an exemplary implementation of a device according to an embodiment of the invention, the device comprising a torsion mirror, a prism and a Grin lens.

FIG. 4a shows in motion a fabricated device according to an exemplary embodiment of the present invention, while FIG. 4b shows the same device at rest. FIG. 5 shows an exemplary implantation of a device with fiber optics attached according to an exemplary embodiment of the present invention. The fiber optic components according to an exemplary implementation comprise a Grin lens 60 with 5 mm focal length and a 1 mm micro prism 70 on top of the Grin lens 60. The Grin lens 60 is attached to the bimorph 50.

An amplified bimorph scanning mirror according to an exemplary implementation of the present invention, was modeled, fabricated, and tested for use as the lateral scanning arm in an optical coherence tomography system. The results from the modeling and testing of the exemplary device show that the device is capable of optical scan angles of up to 80 degrees using applied voltages of 35 V at resonant frequencies of 35 Hz. These results suggest that a scanning probe according to an embodiment of the present invention can be appropriate for use in the scanning arm of an OCT imaging system. According to exemplary embodiments of the present invention, micromachine-amplified piezoelectric bimorph scanners can be fabricated completely from the same silicon wafer with minimal post processing. Such an exemplary implementation of the present invention can facilitate more uniform and stable scanners and can also reduce fabrication cost and difficulty.

According to exemplary embodiments of the present invention, a device can be tailored to suit specific OCT needs.

For example, changing the size of the mirror 20 or the dimensions of the hinges 30 can allow choosing the resonant frequency of the device.

According to exemplary embodiments of the present invention, the small size of the device and large optical scan angles that it can achieve make the device make it ideally suited for use in any OCT system, and in particular, for use in minimally invasive medical imaging. According to exemplary embodiments of the present invention, a scanning device can provide large scan angles in a sector scan format to, for example, allow a physician to better examine suspicious tissues in the lining of bladder and other internal structures for the detection and possible diagnosis of cancerous and precancerous conditions. According to another exemplary aspect present invention, a scanning device can be integrated into a custom-built high speed OCT imaging system. Various other systems can incorporate scanning devices and methods according to embodiments of the present invention. Such other systems include, but are not limited to, laser hair removal, tattoo removal, and bar code scanning devices.

While exemplary embodiments of the present invention have been described with reference to exemplary implementations thereof, it will be understood by those skilled in the art that various changes and modifications may be made therein without departing from the scope of the present invention as defined by the following claims.

What is claimed is:

1. A scanning apparatus comprising:
   a mirror structure comprising a mirror, a first side, and a second side opposite to said first side;
   a first torsion hinge comprising a third side and a fourth side opposite to said third side;
   a base; and
   a forced vibration generator comprising a piezoelectric bimorph attached to said base;
   wherein said third side of said first hinge is attached to said first side and said fourth side of said first hinge is attached directly to said base, whereby said mirror structure is suspended by said first torsion hinge.

2. The apparatus according to claim 1, wherein at least said first torsion hinge comprises polyimide.

3. The apparatus according to claim 1, wherein said forced vibration generator operates at approximately the same frequency as a resonant frequency of a structure comprising at least said mirror structure, said first torsion hinge and said base.

4. The apparatus according to claim 1, wherein said mirror structure further comprises a support comprising said first side and said second side, said mirror being attached to said support.

5. The apparatus according to claim 4, wherein said support and said base are integrally formed and coupled together by said first torsion hinge.

6. The apparatus according to claim 1, wherein said mirror comprises said first side and said second side.

7. An optical coherence tomography system comprising said scanning apparatus as claimed in claim 1.

8. The optical coherence tomography system according to claim 7 further comprising a lateral scanning arm, wherein said lateral scanning arm comprises said scanning apparatus.

9. A scanning apparatus comprising:
   a mirror structure comprising a mirror, a first side, and a second side opposite to said first side
   a first torsion hinge comprising a third side and a fourth side opposite to said third side;
   a base;
   a forced vibration generator comprising a piezoelectric bimorph attached to said base; and
   a second torsion hinge comprising a fifth side and a sixth side opposite to said fifth side;
   wherein said third side of said first hinge is attached to said first side and said fourth side of said first hinge is attached to said base, whereby said mirror structure is suspended. by said first torsion hinge; and
   wherein said fifth side of said second torsion hinge is attached to said second side and said sixth side of side second torsion hinge is attached to said base, whereby said mirror structure is suspended by said first torsion hinge and said second torsion hinge.

10. The apparatus according to claim 3, wherein:
    said first torsion hinge is attached to said first side at approximately a center portion of said first side; and
    said second torsion hinge is attached to said second side at approximately a center portion of said second side.

11. A scanning apparatus comprising:
    a mirror structure comprising a mirror, a first side, and a second side opposite to said first side;
    a first torsion hinge comprising a third side and a fourth side Opposite to said third side:
    a base; and
    a forced vibration generator comprising a piezoelectric bimorph attached to said base;
    wherein said third side of said first hinge is attached to said first side and said fourth side of said first hinge is attached to said base, whereby said mirror structure is suspended by said first torsion hinge: and
    wherein the mirror structure pivots about the first torsion hinge upon application of a forced vibration to at least said base.

12. A scanning apparatus comprising:
    a mirror structure comprising a mirror, a first side, and a second side opposite to said first side;
    a first torsion hinge comprising a third side and a fourth side opposite to said third side; and
    a base;
    wherein said third side of said first hinge is attached to said first side and said fourth side of said first hinge is attached to said base, whereby said mirror structure is suspended by said first torsion hinge, and
    a structure comprising at least said mirror structure, said first torsion hinge and said base has a resonant frequency on the order of 30 Hz to 40 Hz.

13. The apparatus according to claim 12, further comprising a piezoelectric bimorph attached to said base for generating a forced vibration, wherein said bimorph is driven below a resonant frequency thereof.

14. A scanning apparatus comprising:
    a mirror structure comprising a first reflecting surface, a first side, and a second side opposite to said first side;
    a first torsion hinge comprising a third side and a fourth side opposite to said third side; and
    a base;
    a focusing element;
    a beam guide; and
    a second reflecting surface;
    wherein said third side of said first hinge is attached to said first side and said fourth side of said first hinge is attached to said base, whereby said mirror structure is suspended by said first torsion hinge, and
    said second reflecting surface is arrange with respect to said focusing element and said mirror structure to direct a beam from said beam guide onto the first reflecting surface of said mirror structure.

15. The apparatus according to claim 14, wherein said focusing element comprises a Grin lens.

16. The apparatus according to claim 14, wherein said beam guide is an optical fiber.

17. The apparatus according to claim 14, further comprising a prism, wherein said prism comprises said second reflecting surface.

18. The apparatus according to claim 17, wherein said prism is a right angle microprism.

19. The apparatus according to claim 14, wherein said beam comprises an infra-red beam.

20. A scanning apparatus comprising:
- a mirror structure comprising a mirror, a first side, and a second side opposite to said first side;
- a first torsion hinge comprising a third side and a fourth side opposite to said third side;
- A base; and
- a forced vibration generator comprising a piezoelectric bimorph attached to said base;
- wherein said third side of said first hinge is attached to said first side and said fourth side of said first hinge is attached to said base, whereby said mirror structure is suspended by said first torsion hinge; and
- wherein said first torsion hinge and said base are integrally formed.

21. A scanning apparatus comprising:
- a mirror structure comprising a mirror, a first side, and a second side opposite to said first side;
- a first torsion hinge comprising a third side and a fourth side opposite to said third side;
- a base;
- a forced vibration generator comprising a piezoelectric bimorph attached to said base; and
- a second torsion hinge,
- wherein said third side of said first hinge is attached to said first side and said fourth side of said first hinge is attached to said base, whereby said mirror structure is suspended by said first torsion hinge;
- wherein said mirror structure further comprises a support comprising said first side and said second side, said mirror being attached to said support;
- wherein said support and said base are integrally formed and coupled together by said first torsion hinge; and
- wherein, said support is coupled to said base by said first and second torsion hinges, said first and second torsion hinges being formed on opposite sides, respectively, of said support, whereby said support is capable of oscillating about an axis extending through said first and said second torsion hinges, said axis being parallel with a plane of said support.

* * * * *